United States Patent
Jones et al.

(10) Patent No.: US 8,283,827 B2
(45) Date of Patent: Oct. 9, 2012

(54) OVER-MOLDED LIQUID COOLED THREE-STACK MOTOR

(75) Inventors: Robert M. Jones, Brooksville, FL (US); Joseph M. Lisiecki, Springhill, FL (US)

(73) Assignee: Robert M. Jones, Brooksville, FL (US)

( * ) Notice: Subject to any disclaimer, the term of this patent is extended or adjusted under 35 U.S.C. 154(b) by 182 days.

(21) Appl. No.: 12/754,476

(22) Filed: Apr. 5, 2010

(65) Prior Publication Data

US 2010/0253160 A1 Oct. 7, 2010

Related U.S. Application Data

(60) Provisional application No. 61/166,401, filed on Apr. 3, 2009.

(51) Int. Cl.
*H02K 16/00* (2006.01)
*H02K 21/26* (2006.01)
*H02K 15/12* (2006.01)
*H02K 9/00* (2006.01)

(52) U.S. Cl. .. 310/112; 310/114; 310/68 R; 310/156.47; 310/43; 310/64

(58) Field of Classification Search ............... 310/112, 310/114, 68 D, 43, 156.47
See application file for complete search history.

(56) References Cited

U.S. PATENT DOCUMENTS

| | | | |
|---|---|---|---|
| 3,809,990 A | 5/1974 | Kuo et al. | |
| 3,921,017 A | 11/1975 | Hallerbäck | |
| 4,035,677 A | 7/1977 | Kusayama et al. | |
| 4,355,249 A | 10/1982 | Kenwell | |
| 4,394,594 A | 7/1983 | Schmider et al. | |
| 4,556,809 A | 12/1985 | Beisse et al. | |
| 4,603,457 A | 8/1986 | Lechner et al. | |
| 4,777,397 A | 10/1988 | Parshall | |
| 4,972,112 A | 11/1990 | Kim | |
| 5,008,572 A | 4/1991 | Marshall et al. | |
| 5,073,735 A * | 12/1991 | Takagi | 310/71 |
| 5,140,210 A | 8/1992 | Shirakawa | |
| 5,241,438 A | 8/1993 | Matsushima | |
| 5,347,191 A | 9/1994 | Wood | |
| 5,554,900 A | 9/1996 | Pop, Sr. | |
| 5,710,474 A | 1/1998 | Mulgrave | |
| 5,789,831 A | 8/1998 | Kregling | |
| 5,804,761 A | 9/1998 | Donegan et al. | |
| 5,859,482 A * | 1/1999 | Crowell et al. | 310/58 |

(Continued)

FOREIGN PATENT DOCUMENTS

EP 2016664 1/2009

(Continued)

OTHER PUBLICATIONS

Brushless DC Motor, <URL: www.freescale/com>, downloaded Feb. 5, 2007.

(Continued)

*Primary Examiner* — Quyen Leung
*Assistant Examiner* — Thomas Truong
(74) *Attorney, Agent, or Firm* — Hamilton, Brook, Smith & Reynolds, P.C.

(57) ABSTRACT

A brushless, liquid or air cooled, direct current motor formed from a three stack stator and three section rotor assembly using an integrated water cooled or air cooled housing and over-molding techniques.

13 Claims, 4 Drawing Sheets

U.S. PATENT DOCUMENTS

| | | | |
|---|---|---|---|
| 5,861,693 | A | 1/1999 | Takahashi |
| 5,929,547 | A | 7/1999 | Kim |
| 5,982,074 | A | 11/1999 | Smith et al. |
| 6,118,202 | A * | 9/2000 | Pinkerton ............ 310/178 |
| 6,153,953 | A | 11/2000 | Isozaki et al. |
| 6,153,957 | A | 11/2000 | Takano |
| 6,232,691 | B1 | 5/2001 | Anderson |
| 6,252,323 | B1 * | 6/2001 | Nishikawa et al. ...... 310/156.01 |
| 6,538,356 | B1 | 3/2003 | Jones |
| 6,621,189 | B1 | 9/2003 | Flynn |
| 6,700,270 | B2 | 3/2004 | Yanashima et al. |
| 6,800,970 | B2 | 10/2004 | Aoshima |
| 6,844,647 | B2 | 1/2005 | Horber |
| 6,867,524 | B2 * | 3/2005 | Liang ................ 310/156.47 |
| 6,888,279 | B2 | 5/2005 | Haner |
| 6,906,443 | B2 | 6/2005 | Luo et al. |
| 6,909,215 | B2 | 6/2005 | Bryant |
| 6,924,579 | B2 | 8/2005 | Calley |
| 6,944,906 | B2 * | 9/2005 | Moein et al. .............. 15/250.3 |
| 6,992,418 | B2 | 1/2006 | Hans |
| 7,002,275 | B2 | 2/2006 | Hans |
| 7,051,421 | B2 | 5/2006 | Biais et al. |
| 7,057,326 | B2 | 6/2006 | Ren et al. |
| 7,129,608 | B2 | 10/2006 | Eppler et al. |
| 7,144,468 | B2 | 12/2006 | Decristofaro et al. |
| 7,180,212 | B2 * | 2/2007 | Anwar et al. ............. 310/68 R |
| 7,218,021 | B2 | 5/2007 | Nilson |
| 7,504,752 | B2 | 3/2009 | Head |
| 7,592,728 | B2 | 9/2009 | Jones |
| 7,608,963 | B2 | 10/2009 | Jones |
| 2002/0109428 | A1 | 8/2002 | Kudlacik |
| 2004/0012271 | A1 | 1/2004 | Du |
| 2005/0022358 | A1 | 2/2005 | Hagan et al. |
| 2006/0103247 | A1 | 5/2006 | Kotajima |
| 2006/0202573 | A1 * | 9/2006 | Uehara et al. ................ 310/64 |
| 2006/0244333 | A1 | 11/2006 | Jeung |
| 2007/0063595 | A1 * | 3/2007 | Habibi et al. ............... 310/67 A |
| 2007/0296297 | A1 | 12/2007 | Jones et al. |
| 2008/0143203 | A1 | 6/2008 | Purvines et al. |

FOREIGN PATENT DOCUMENTS

| | | |
|---|---|---|
| EP | 2025050 | 2/2009 |
| JP | 6 193583 | 7/1994 |
| WO | WO 2007/133499 A2 | 11/2007 |
| WO | WO 2007/133500 A2 | 11/2007 |

OTHER PUBLICATIONS

Kikuchi, T. and Kenjo, T., "A Unique Desk-top Electrical Machinery Laboratory for the Mechatronics Age," *IEEE*, pp. 1-20, (1997),<URL: www.ewh.ieee.org> downloaded Feb. 5, 2007.

Luk, P.C.K., and Jinupon, K. P., "Direct Work Control for a Three-Stack Switched Reluctance Motor," *IEEE*, 0-7803-9033:24622466 (2005).

International Search Report and Written Opinion of the International Searching Authority, dated Aug. 5, 2010, of International Application No. PCT/US2010/001026.

International Search Report and Written Opinion of the International Searching Authority, dated Jul. 2, 2008, of International Application No. PCT/US2007/011023.

International Preliminary Report on Patentability and Written Opinion of the International Searching Authority, dated Nov. 20, 2008, of International Application No. PCT/US2007/011023.

International Search Report and Written Opinion of the International Searching Authority, dated Feb. 8, 2008, of International Application No. PCT/US2007/011024.

International Preliminary Report on Patentability and Written Opinion of the International Searching Authority, dated Nov. 20, 2008, of International Application No. PCT/US2007/011024.

International Preliminary Report on Patentability from PCT/US2010/001026 dated Oct. 13, 2011.

* cited by examiner

OVER-MOLDED LIQUID COOLED THREE-STACK MOTOR

RELATED APPLICATION(S)

This application claims the benefit of U.S. Provisional Application No. 61/166,401, filed on Apr. 3, 2009, the entire contents of which are incorporated by reference.

SUMMARY OF THE INVENTION

The present invention is a brushless, liquid cooled or air cooled direct current motor formed from a three stack stator and three section rotor assembly using an integrated water cooled or air cooled housing.

BRIEF DESCRIPTION OF THE DRAWINGS

FIGS. 3 and 3A are an exploded view showing the stator and rotor in more detail with an air cooled housing.

DETAILED DESCRIPTION OF THE INVENTION

Figure 1:
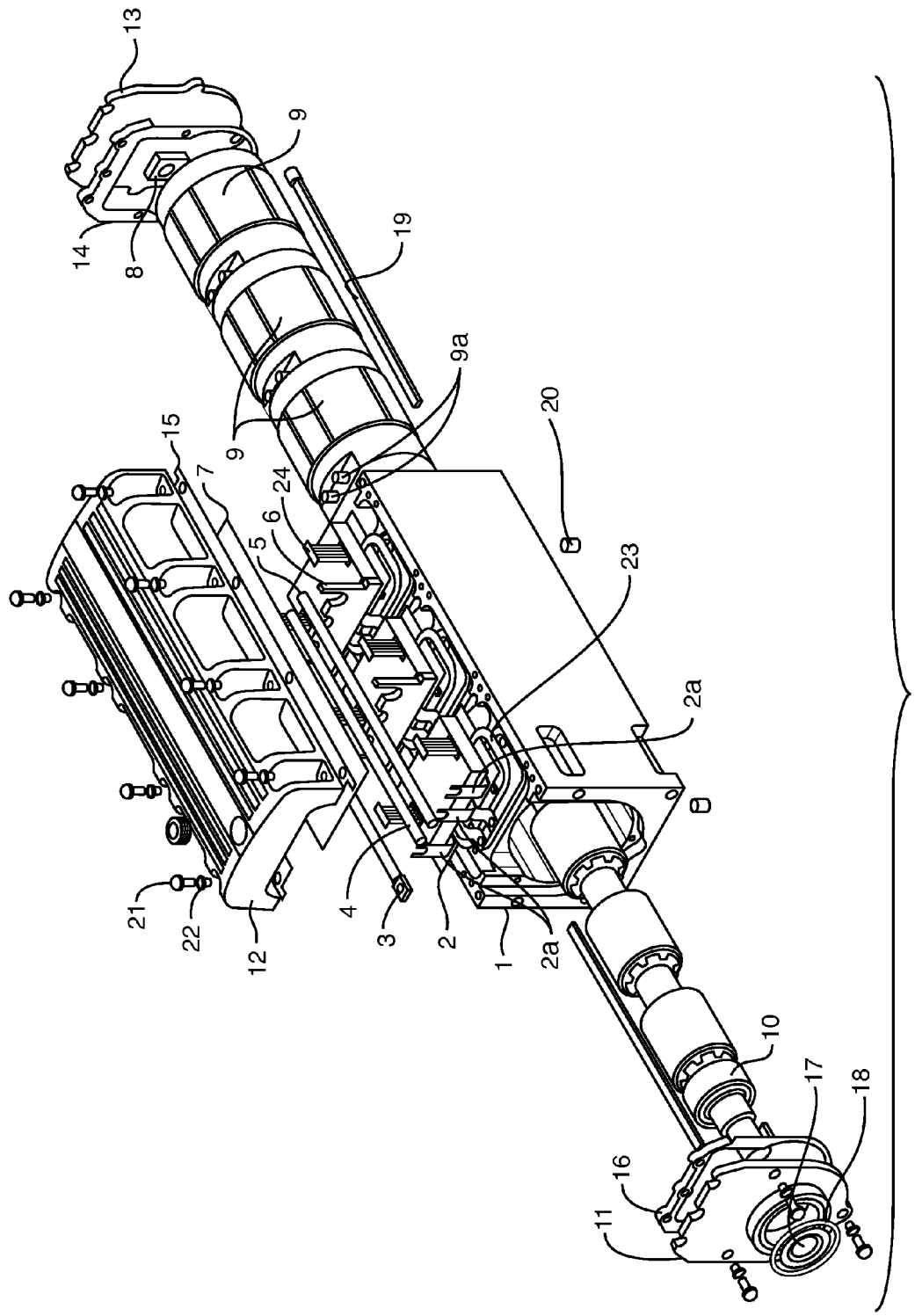
FIG. 1 is an exploded perspective view of the components of the motor.

This application incorporates by reference U.S. patent application Ser. No. 11/800,716, filed May 7, 2007, entitled "Electric Machine Having Segmented Stator" and co-pending U.S. patent application Ser. No. 11/800,715, filed May 7, 2007, entitled "Crimped Rotor for an Electric Brushless Direct Current Motor" and co-pending U.S. patent application Ser. No. 11/827,830 filed Jul. 13, 2007 entitled "Automatic Winder for an Inside Brushless Stator".

A description of example embodiments of the invention follows.

The components of the motor shown in FIG. 1, FIG. 2, FIG. 3 and FIG. 4 will now each be described in more detail. The numbered paragraphs below each describe a component that has a reference number as used in the figures, although different reference numbers are used to refer to the same components in different drawings.

1. Main motor housing. This housing is made out of a single bar of aluminum 1, 37 as described in more detail below. It can be configured as either a water cooled housing 1 in which the housing is ported to water cool the motor drivers, or it can be an air cooled housing 37. It is the frame on which the rest of the motor is built. The main motor housing 1 may be made of a 4" square section bar of aluminum. To install the stators 9, that are actually 005-006" larger than the housing bore, the housing is heated to above 500 deg F. This expands the aluminum to a bore diameter greater than the outside diameter of the stators 9 so that they can be installed. When cooled, there is an interference fit of 0.005". This process is sometimes referred to as "shrink fit". In this application, the interference gives optimal heat transfer between the components, and retains the stators 9 up to a temperature that far exceeds the expected temperature of the assembly. The stator outside diameters are ground prior for accuracy and optimal heat transfer in this unique process.

2. Phase module. This module is for phase A, and there are two additional modules for phase B and C that are essentially identical for description purposes. They are sometimes called drivers but, without the digital signal processor (DSP) board 7, it is an incomplete driver. There are five jumpers 2A coming from each module. Since two are connected, they are considered four conductors. When viewing FIG. 1. phase module 2, from "back" to "front" they are labeled as follows: positive, stator lead, "y" connection (aka "star" connection), and negative. In the FIG. 1 motor, the drivers are directly water-cooled with coolant from the main motor housing. A seal 15 is provided to prevent coolant leakage. All three phase modules 2 are essentially identical. The conductors 2A (aka leads, jumpers) facing up are soldered to the bus bars 3 (aka motor leads) and the "y" bar 4. The two conductors facing down are soldered to the stator terminals 9A below.

3. Bus bar. Sometimes called motor leads, these two bus bars 3 distribute power to the three phase modules.

4. "Y" connection bus bar. This bus bar 4 connects one terminal of the three stators together. When drawn in schematic, the circuit looks like a "y".

5. Bus bar antivibration mount. These high temperature rubber bushings 5 dampen vibrations in the bus bars induced from high motor speed harmonics.

6. Bus bar loom. These high temperature plastic looms 6 support the three bus bars 3, 4 and the DSP board 7. The bus bars 3, 4 and DSP board 7 snap into place without fasteners. The looms are fit in a contoured pocket in the main housing 1, 37 just prior to bus bar installation. There are no fasteners. The top cover retains them when installed 7. DSP board. Sometimes called the driver board but technically, the board on top of the phase module is the driver board. This DSP board 7 connects the three phase modules and the hall commutator 8 electronically. DSP stands for digital signal processor. This micro-processor can be programmed to modify, limit, or maximize the motor performance.

8. Hall commutator cordset. This assembly 8 comprises the three hall sensors, the hall interconnect circuit board, a ribbon cable, and a hard rubber shell that is formed around it in an injection molding process called over-molding or insert molding. This sensor mounting technique was developed for ease of final assembly, protection of the sensors and circuit, and accuracy of locating the sensors. This assembly is self locating and fastened with one screw. A snap-in assembly is also possible but not preferred due to risk associated with harmonic motor vibration in this assembly.

9. Over-molded stator phase. The stator 9 is typically an array of electromagnets windings that are sequentially activated and polarized to induce axial torque on the rotor. By switching the electromagnets windings on and off and also changing the polarity of the magnetic field, the electromagnets windings either embrace or repel the permanent magnets (25, 26 in FIG. 3) of the rotor 10. This is based on the phenomena where a simple bar magnet's north and south poles are attracted to opposite poles and repel poles of the same polarity. Hence the term "opposites attract". In this three stack motor, unlike multiple phase or multiple pole stators, all of the electromagnets windings of a given stator 9 are active at the same time. This assembly comprises a laminated stack of silicon iron FIG. 2, 34, two winding inserts FIG. 2, 33 to protect the magnet wire from sharp corners, a coating of parylene for insulation from surrounding metal, two stator terminals 9A for connecting the wire bundles to the phase module conductors, a wound bundle of several magnet wire conductors 36 and an over-mold FIG. 2, 32 of high temperature, glass reinforced thermoplastic.

Figure 2:
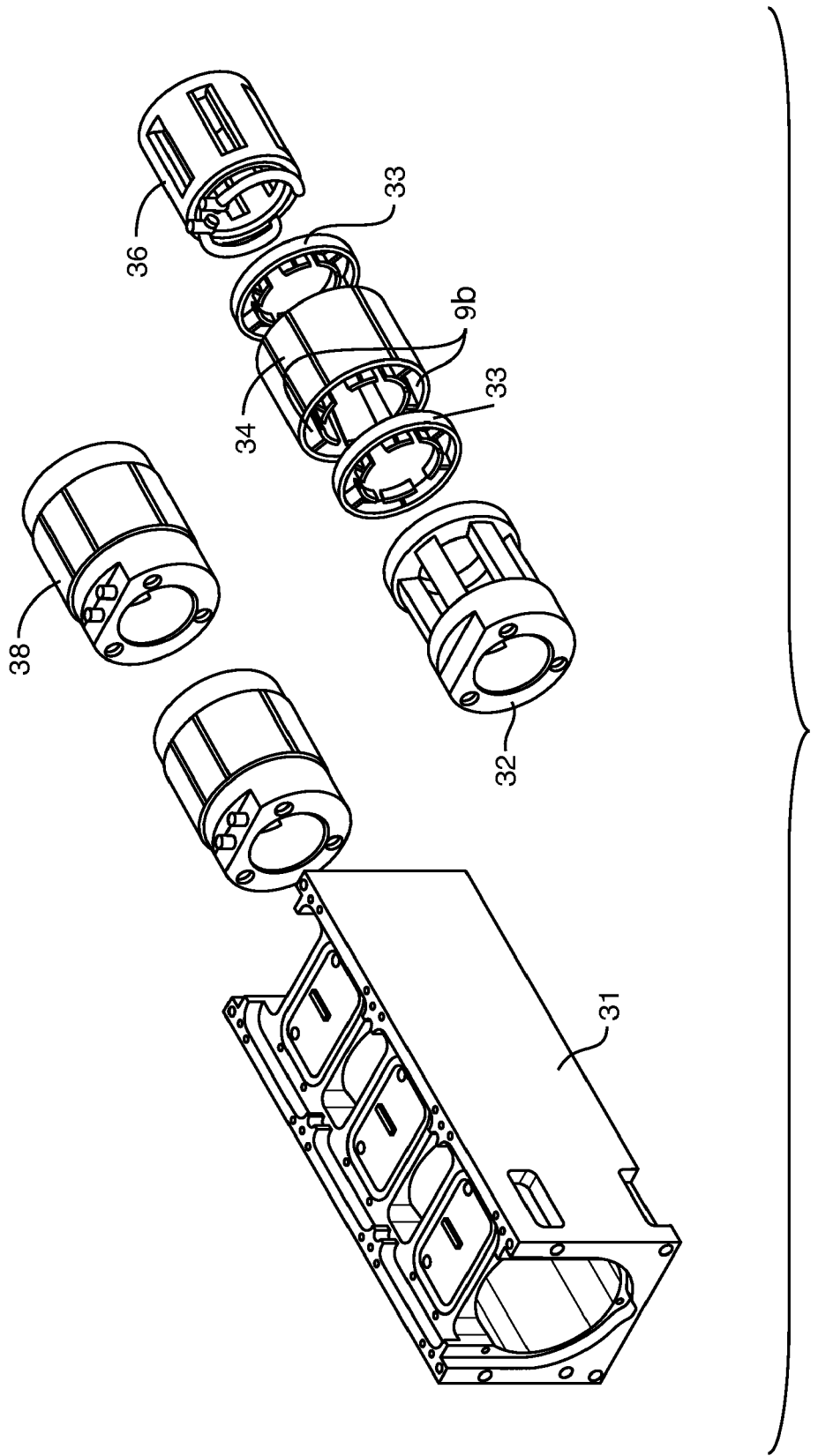
FIG. 2 shows more detail of the components of the stator.

The over-mold 32 as shown in FIG. 2 is "removed" for illustration purposes, but in reality cannot be removed. It is injected molded through the assembly. On the ends of this over-mold 32, there are locating features, e.g., pin and cavity features, that align the stators 9 and couple them during and after installation. The front motor cover 11 also has pin features. In the unlikely event that the motor temperature allows the housing to release the stators and/or torque exceeds conceivable levels, these features will maintain radial orientation of the stators 9 until those conditions subside. The main purpose of the pin features is to accurately align the stators during the shrink fit operation. This over-molded plastic, as opposed to varnish on the magnet wire, efficiently conducts heat, which in turn raises resistance, away from the stator 9 and the electromagnet windings. The stators 9 preferably are lined up straight, e.g., with no radial offset, for ease of manufacturing, electrical symmetry considerations, and ease of assembly.

There are two winding inserts 33 press-fit into the ends of the stator lamination stack 34 prior to the winding of the stator 9. The winding inserts 33 are injected molded and are preferably made of high temperature glass reinforce thermoplastic. The purpose of the winding inserts 33 is to protect the electromagnet windings 36 during the winding process, and to maintain the position of electromagnet windings 36 until they are over-molded. In this preferred embodiment, a coating, e.g., parylene film, is applied to the stator 9 to protect the electromagnetic wires inside the stator slots 9B. In another embodiment, the process of over-molding would comprise over-molding the winding inserts 33 through the stator slots 9B in an over-mold that would better protect the copper wires during winding by virtue of no exposed metal on the inside diameter, thereby eliminating the coating and press assembly. The winding inserts 33, in conjunction with specialized winding equipment, allow the wire bundles to be pulled around the stator fingers without the risk of damaging the wire coating. This would minimize the length of end-turns.

The electromagnet windings 36 are shown "removed" for illustration, but in reality could not be removed. They are machine wound through assembly. The bundles of wire attached to the stator terminals 9A are made up of 34 individual conductors of copper magnet wire with a coating, such as a polyimide dielectric coating. They are wound in the present assembly thirty-four at a time, but thirty-four is not necessarily a limit, with specialized winding equipment. Magnet wire can reside in the stator slots 9B in a quantity directly corresponding to the volume of the stator slot 9B. In the drawings the individual wires are not depicted. However, it should be understood that this representation is of the area in the assembly that can be occupied by magnet wire. Although a large quantity of wire in the stator slot 9B is optimal, the "endturns" or resulting loops outside the stator slot 9B and any conductors between the motor driver 2 and the wire internal to the stator slot 9B add resistance and need to be kept short and/or cross-sectionally large for less resistance.

At the conclusion of the above over-molding and assembly operations, specifically the over-molding and assembly of the plastic injection stator over-mold 32, the winding insert over-mold 33, the laminated stator assembly 34, and the magnet wire windings 36, the entire stator 9 is over-molded again to reduce air space, increase thermo conductivity and increase hermetic properties as depicted in the final stator assembly 35.

10. Rotor assembly. The three rotor magnet 10 assemblies are over-molded and clocked at 20 degree interval using the alignment grooves machined into the rotor shaft. A unique feature of this design is the orientation of the center magnet FIG. 2, 25, 26 assembly. The magnetic polarity of this assembly is exactly opposite the other two. This inventive feature makes the electrical symmetry, and therefore, minimal length stator leads possible. The alternative to this practice is to reverse the polarity of the stator. This would complicate the electrical layout, assembly, manufacturing of components, and cause more electrical resistance within the circuitry. A cooling impeller is over-molded into each magnet assembly. The magnets preferably are samarium cobalt. They are ground on the outside diameter. After mounting to ensure proper balance and dimensional accuracy. The rotor assembly is balanced prior to assembly.

11. Front motor cover. Made of high temperature thermoplastic, this cover 11 supports the rotor shaft seal 18, the transmission seal 17, the bus bars 3 and 4, and helps to retain the rotor assembly 10. It is fastened with 3 machine screws.

12. Top motor cover. Also high temperature thermo plastic, this cover 12 preferably is symmetrical and can be mounted in the reverse position where applications require the bus bars 3 and 4 and/or communication cable or the access port to exit from the rear of the motor.

13. Rear motor cover. Also high temperature thermo plastic, this cover 13 is mounted with 3 machine screws and can also support the bus bars 3 and 4. The motor will operate without it but is part of the hermetic enclosure.

14. Rear cover seal. The rear cover seal 14 may be made of a high temp injection molded rubber. Also seals bus bars or has alternative plugs. The front 16 and rear cover seal 14 may be interchangeable depending on exit of the bus bars 3 and 4.

15. Top cover seal. The top cover seal 15 may be a high temp injection molded rubber. Left, right and front to back all may be interchangeable.

16. Front cover seal. The front cover seal 16 may be made of a high temp injection molded rubber. Also seals bus bars or has alternative plugs. The front 16 and rear cover seal 14 may be interchangeable depending on exit of the bus bars 3 and 4.

17. Transmission seal. The transmission seal 17 is a high temp rubber o-ring and seals the interfacing transmission fluid.

18. Rotor shaft seal. The rotor shaft seal 18 may be a high temp, high wearing, spring loaded, lip seal. It completes the hermetic enclosure while the rotor shaft 10 is stationary and not attached to the transmission and prevents transmission fluid from entering the motor.

19. Coolant baffle. The coolant baffle 19 is commonly used in injection molds to make coolant circulate and cool the housing.

20. ⅛ npt plug. This plug 20 is a plug for cross-drilled coolant holes.

21. Machine screws. The machine screws 21 are for retaining the motor covers.

22. Liner bushing. This machined liner bushing 22 component is installed with all machine screws that fasten plastic covers to limit compression on the plastic and prevent creep strain and cracking.

23. Module seal. The module seal 23 may be a high temp injection molded rubber. The module seal 23 seals the module where it is placed over a cavity of coolant.

24. Pin header. These six pin header 24 components each have five conductors that carry electrical signals between the circuit boards 2. They replace expensive cables that would otherwise clutter the electronic assembly.

Figure 3:
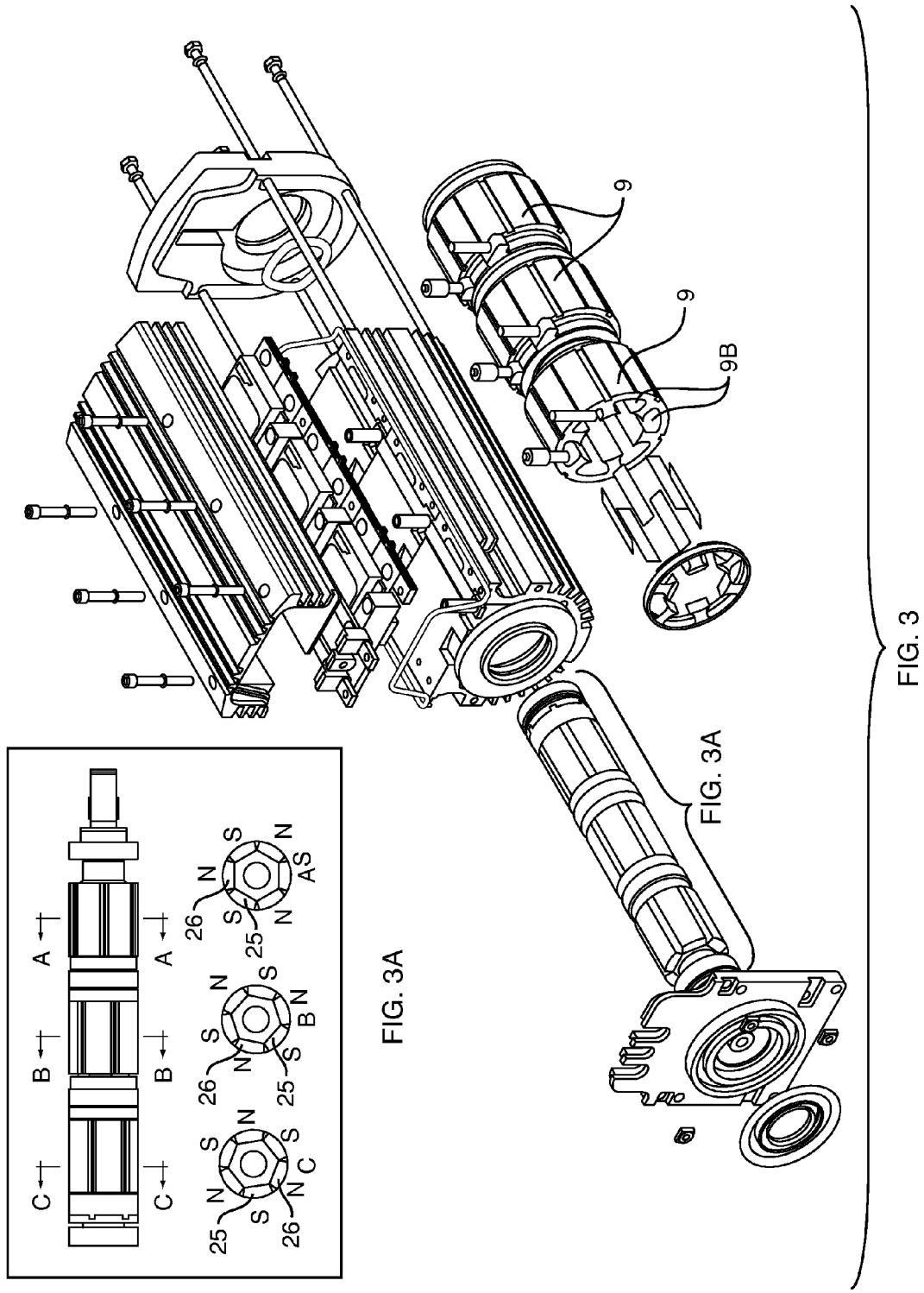

FIG. 3 is a more detailed view of the stator 9 and rotor 10 sub-assemblies. In the upper left hand corner are sectional views (FIG. 3A) of the rotor shaft assembly showing the relative radial position of the rotor magnet assemblies 25, 26. Thus, it is understood that orientation of the center magnets assembly is exactly the opposite of the other two. This allows for the leads from the controller module to the stator to be as short as possible.

In the lower right hand corner of FIG. 3 there is shown the three phase stator assembly 9 as removed from its respective housing. The plastic over-mold 32 and wire are removed from the laminated stator assembly 34 in this view to better illustrate the volume of the stator slots 9B which are approximately three times the volume of stator slots in conventional motors.

Figure 4:
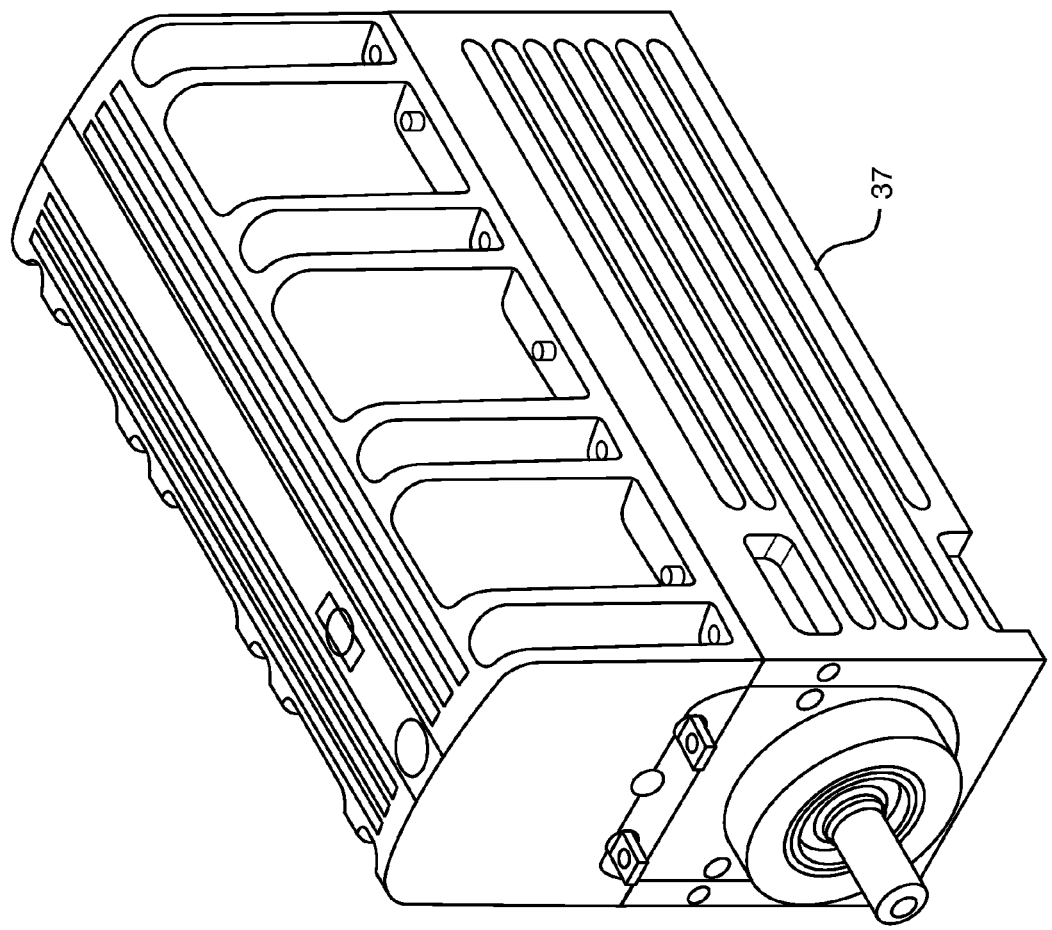
FIG. 4 is a perspective view of an air-cooled casing of an electric motor.

FIG. 4 shows another embodiment of an electric motor with a housing that has air cooling vanes on its outside surfaces.

While this invention has been particularly shown and described with references to example embodiments thereof, it will be understood by those skilled in the art that various changes in form and details may be made therein without departing from the scope of the invention encompassed by the appended claims.

What is claimed is:

1. A direct current electric motor comprising:
    a housing;
    three electrically and mechanically independent stator sections longitudinally disposed along a common axis within the housing, and independently connected to three motor drive phase modules, wherein a controller circuitry sequentially activates the three motor drive phase modules;
    a three stage rotor assembly having a center rotor element and two end rotor elements, the center rotor element having a magnetic orientation that is in opposite phase from the magnetic orientation of the end rotor elements; and
    a motor driver circuit disposed integral with the housing, the motor driver circuit comprising the three separate motor drive phase modules, each motor drive phase module electrically coupled to a respective one of the independent stator sections;
    wherein each of the three electrically and mechanically independent stator sections includes an injection-molded plastic over-mold.

2. The direct current electric motor of claim 1 wherein each of the three electrically and mechanically independent stator sections includes winding inserts at ends of the stator sections; and wherein the over-mold covers the winding inserts and wire windings over the winding inserts and in stator slots.

3. The direct current electric motor of claim 1 wherein each over-mold includes locating features configured to maintain radial orientation of the stators within the housing.

4. The direct current electric motor of claim 1 wherein each of the three electrically and mechanically independent stator sections includes a coating over the stator that protects wire windings inside stator slots.

5. The direct current electric motor of claim 1 wherein each of the three electrically and mechanically independent stator sections includes an over-mold of the stator sections to protect wire windings in stator slots.

6. The direct current electric motor of claim 1 further comprising a digital signal processor disposed within the housing.

7. The direct current electric motor of claim 6 wherein the digital signal processor is disposed on a circuit board within the housing in close proximity to the motor driver circuit; and
    wherein each of the three separate motor drive phase modules is electrically coupled to the digital signal processor on the circuit board by pin headers.

8. The direct current electric motor of claim 7 wherein the digital signal processor is programmable to control power signals to each of the three separate motor drive phase modules.

9. The direct current electric motor of claim 1 further comprising at least one bus bar configured to distribute power to the three separate motor drive phase modules.

10. The direct current electric motor of claim 1 wherein the housing includes air cooling vanes.

11. The direct current electric motor of claim 1 wherein the housing is ported, wherein the housing is further configured to circulate a coolant through the motor.

12. The direct current electric motor of claim 1 wherein the injection-molded plastic over-mold is a made from glass reinforced thermoplastic.

13. The direct current electric motor of claim 1 wherein the plastic over-mold has an interference fit around the mechanically independent stator sections of less than 0.005 inches.

* * * * *